United States Patent
Nola

(10) Patent No.: US 9,797,352 B2
(45) Date of Patent: Oct. 24, 2017

(54) COMPRESSION-LIMITING FASTENER FOR ATTACHING INTAKE MANIFOLD FLANGE HAVING COMPLIANCE RING TO CAM COVER

(71) Applicant: Ford Global Technologies, LLC, Dearborn, MI (US)

(72) Inventor: Gary Nola, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/013,184

(22) Filed: Feb. 2, 2016

(65) Prior Publication Data

US 2017/0218889 A1    Aug. 3, 2017

(51) Int. Cl.
| | |
|---|---|
| *F02M 35/10* | (2006.01) |
| *F16B 41/00* | (2006.01) |
| *F16B 39/24* | (2006.01) |
| *F02M 35/104* | (2006.01) |

(52) U.S. Cl.
CPC .... *F02M 35/10085* (2013.01); *F02M 35/104* (2013.01); *F16B 39/24* (2013.01); *F16B 41/002* (2013.01)

(58) Field of Classification Search
CPC ............ F02M 35/10085; F02M 35/104; F16B 41/002; F16B 39/24
USPC ....................................... 123/184.21; 411/352
See application file for complete search history.

(56) References Cited

U.S. PATENT DOCUMENTS

| | | | |
|---|---|---|---|
| 4,289,061 A | 9/1981 | Emmett | |
| 4,975,008 A * | 12/1990 | Wagner | F02B 77/00 411/337 |
| 5,513,603 A | 5/1996 | Ang et al. | |
| 6,192,849 B1 * | 2/2001 | Powell | F02B 75/22 123/184.34 |
| 6,394,055 B2 | 5/2002 | Powell | |
| 6,457,925 B1 * | 10/2002 | Genick, II | F16B 41/002 411/339 |
| 7,708,512 B2 * | 5/2010 | McLean | F16B 5/025 411/533 |
| 7,748,936 B2 | 7/2010 | Schneider et al. | |
| 8,696,275 B2 | 4/2014 | Wallace et al. | |
| 8,943,670 B2 | 2/2015 | Lohr et al. | |
| 2008/0304906 A1 | 12/2008 | Maj | |
| 2013/0142588 A1 * | 6/2013 | Slater | F16B 41/002 411/352 |

(Continued)

*Primary Examiner* — Marguerite McMahon
(74) *Attorney, Agent, or Firm* — LeClairRyan

(57) ABSTRACT

A compression limiting fastener assembly includes a plastic intake manifold having an attachment flange and a molded and tuned compliance ring formed on the attachment side of the flange, a plastic cam cover having a threaded attachment insert, a compression limiting bolt fastener for attaching the intake manifold to the cam cover, and a spring stem compression limiter that, when fully threaded into its attachment position, prevents over-compression and possible damage to the plastic components while providing 100% compression. The compliance ring of the intake manifold is concentric with a fastener bore formed through the intake manifold attachment flange. The spring stem compression limiter includes a tubular body having an upper end and a lower end. A spring stem flange is attached to the upper end of the tubular body while a depth limiting flange is attached to the lower end.

20 Claims, 5 Drawing Sheets

(56) References Cited

U.S. PATENT DOCUMENTS

2014/0161562 A1\* 6/2014 Dechant .................. F16B 41/00
                                                                                                    411/500
2016/0069364 A1\* 3/2016 Montague ............. F16B 41/002
                                                                                                     411/511

\* cited by examiner

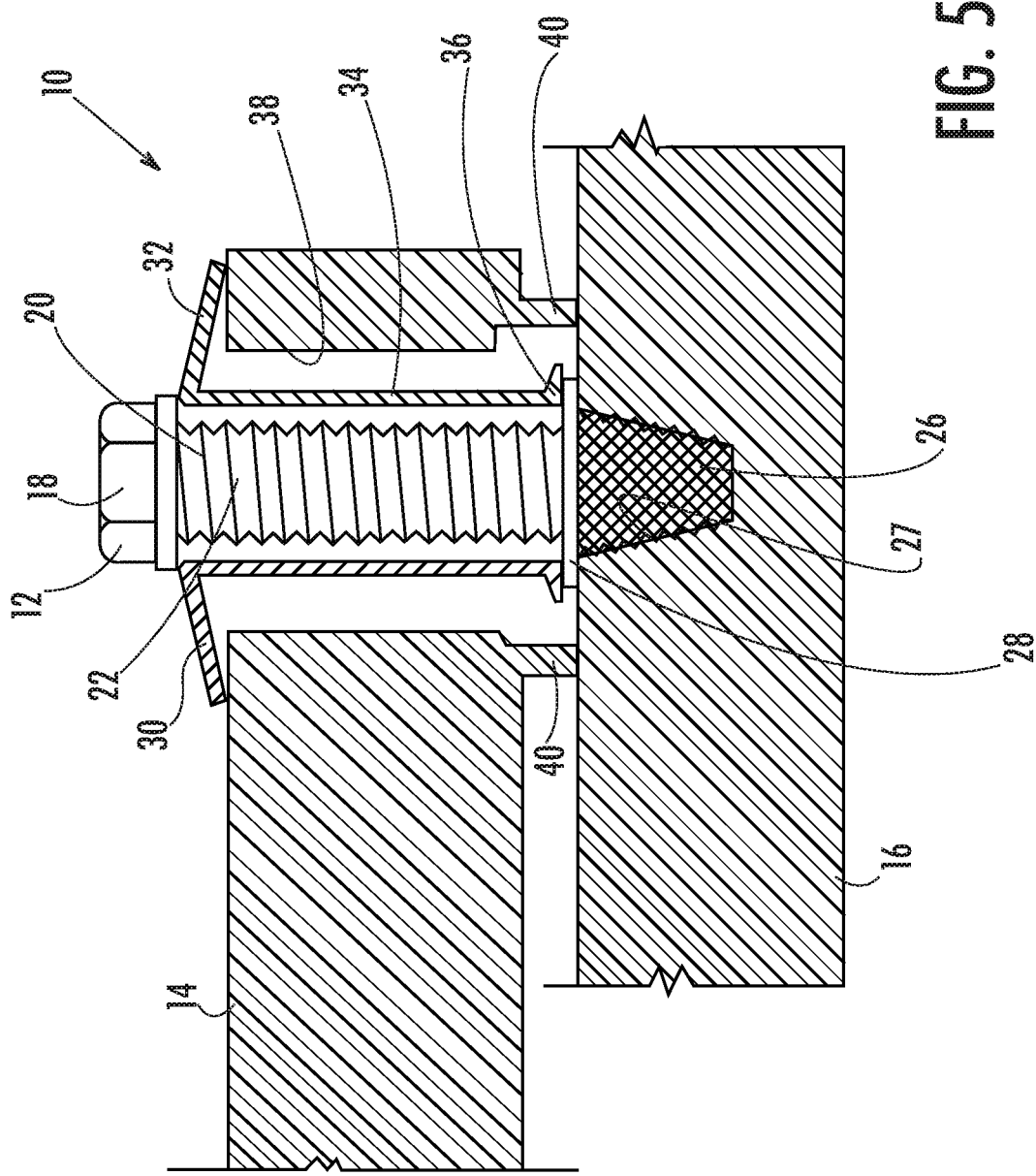

COMPRESSION-LIMITING FASTENER FOR ATTACHING INTAKE MANIFOLD FLANGE HAVING COMPLIANCE RING TO CAM COVER

TECHNICAL FIELD

The disclosed inventive concept relates generally to fastener arrangements for attaching components of a vehicle engine to one another. More particularly, the disclosed inventive concept relates to a fastener arrangement for attaching a plastic intake manifold flange to a plastic cam cover that includes a molded compliance ring on the underside of the intake manifold flange, a cam cover having a threaded insert, and a spring stem compression limiting fastener.

BACKGROUND OF THE INVENTION

There exists an on-going effort in the automotive vehicle community to reduce the engine and powertrain weight in an effort to improve fuel economy. As a key part of this effort, many engine structural components that were traditionally made from relatively heavy materials such as steel and cast iron are now being made from lighter metals. One of these lighter materials is aluminum which is about one-third the weight of a comparable component made from iron. Other lightweight metals, such as magnesium, have also been substituted for the heavier steel and cast iron. Magnesium is itself about two-thirds the weight of aluminum.

While these lighter metals readily demonstrate their weight advantage over steel and cast iron, these metals, and particularly magnesium, are difficult and expensive to produce. In addition, these metals, again particularly magnesium, can fail at attachment points. Further in the case of magnesium, this material is susceptible to mismatches of thermal expansion coefficients which presents a problem when different materials are attached to one another. Furthermore, many magnesium alloys exhibit unacceptable levels of a phenomenon known as "creep" when placed under thermal load in internal combustion engine applications where high operating temperatures are common. The result of thermal creep can be both a reduction of clamping force as well as an increased possibility of fastener loosening at the point of attachment. Accordingly, the use of magnesium has greater challenges than, for example, the use of aluminum as a substitute for steel and cast iron in the manufacture of engine components.

In response to the problems associated with the use of lightweight metals such as aluminum and magnesium in the production of associated engine components, some automotive manufacturers have moved away from using metals for these components altogether. Instead, some manufacturers have used any one of several polymerized materials for these components. A variety of materials, including reinforced plastic materials such as glass-filled nylon or glass-filled or carbon-reinforced polypropylene, have been used for the production of engine components.

While providing an attractive weight advantage over steel and cast iron and providing lower cost and easier manufacturing than part production using either aluminum or magnesium, engine components made from plastic composites also suffer from the problem of creep associated with parts made from magnesium. Over time, a bolt used for attaching a composite part to a substrate may eventually back out of the composite material as the area around the bolt creeps outwardly from under the bolt. This is typically the result of the inherent vibration of the internal combustion engine and this situation becomes more apparent the longer the engine is in use.

Fasteners of several designs have been utilized to fasten one plastic engine component to another in an effort to overcome the above-described in-use challenges. Such fasteners must be suitably designed to prevent damage to the relatively brittle plastic components. An example of such a fastener is a spring-stem fastener that has been used to threadably attach a first plastic engine component to a second plastic engine component. However, tolerances associated with the resulting joint cause conditions where there can be either over-compression of the fastener spring at one extreme and under-compression or a complete absence of compression of the fastener spring at the other extreme.

As in so many areas of vehicle technology there is always room for improvement related to arrangements for attaching plastic components of a vehicle engine.

SUMMARY OF THE INVENTION

The disclosed inventive concept overcomes the problems of known methods of attaching a first plastic component of an internal combustion engine to a second plastic component. In general, the disclosed inventive concept provides an intake manifold flange having a molded and tuned compliance ring formed on its attachment side. A cam cover has an attachment insert. A compression limiting fastener assembly for attaching the intake manifold to the cam cover includes a spring stem compression limiter that, when fully threaded into its attachment position, prevents over-compression while providing 100% compression.

In particular, the compression limiting fastener assembly includes an intake manifold, a cam cover, a compression limiting bolt fastener, and the spring stem compression limiter. The intake manifold flange has a fastener-passing bore, an underside, and a compliance ring extending from the underside. The compliance ring is concentric with the bore.

The threaded cam cover includes an externally-knurled insert that has a bolt-receiving, internal threaded bore. The threaded insert may be of any shape, but is preferably of a conical shape. The threaded insert includes a bearing collar provided at its upper end that functions as a bearing area for the spring stem compression limiter.

The spring stem compression limiter includes a tubular body having an upper end and a lower end. A spring stem flange is attached to the upper end of the tubular body while a depth limiting flange is attached to the lower end.

Upon initial installation of the compression limiting bolt fastener, the spring stem flange is loosely fitted between the bolt head and the upper surface of the plastic intake manifold. As increasing amounts of torque are applied to the compression limiting bolt fastener, the spring stem flange flares out against the upper side of the plastic intake manifold. Threaded insertion of the bolt into the cam cover insert continues until the depth limiting flange of the compression limiter is in full contact with the bearing collar of the threaded insert. At this point, the spring stem flange is flared to its maximum extent and the plastic intake manifold flange is fixedly attached to the cam cover.

Full threaded insertion of the compression limiting bolt fastener into the cam cover insert is accomplished without damage to either the plastic intake manifold or the plastic cam cover and without the possibility of the bolt becoming loose, even under circumstances of extreme engine vibration. The compliance ring, in combination with the compression limiting bolt fastener and the spring stem compression limiter, provides joint robustness without the use of additional parts, thus reducing both material cost and assembly time.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is a view similar to that of FIG. 1 but showing the compression limiting fastener having been threadably inserted to its fully inserted position.

DETAILED DESCRIPTION OF THE PREFERRED EMBODIMENT

Figure 1:
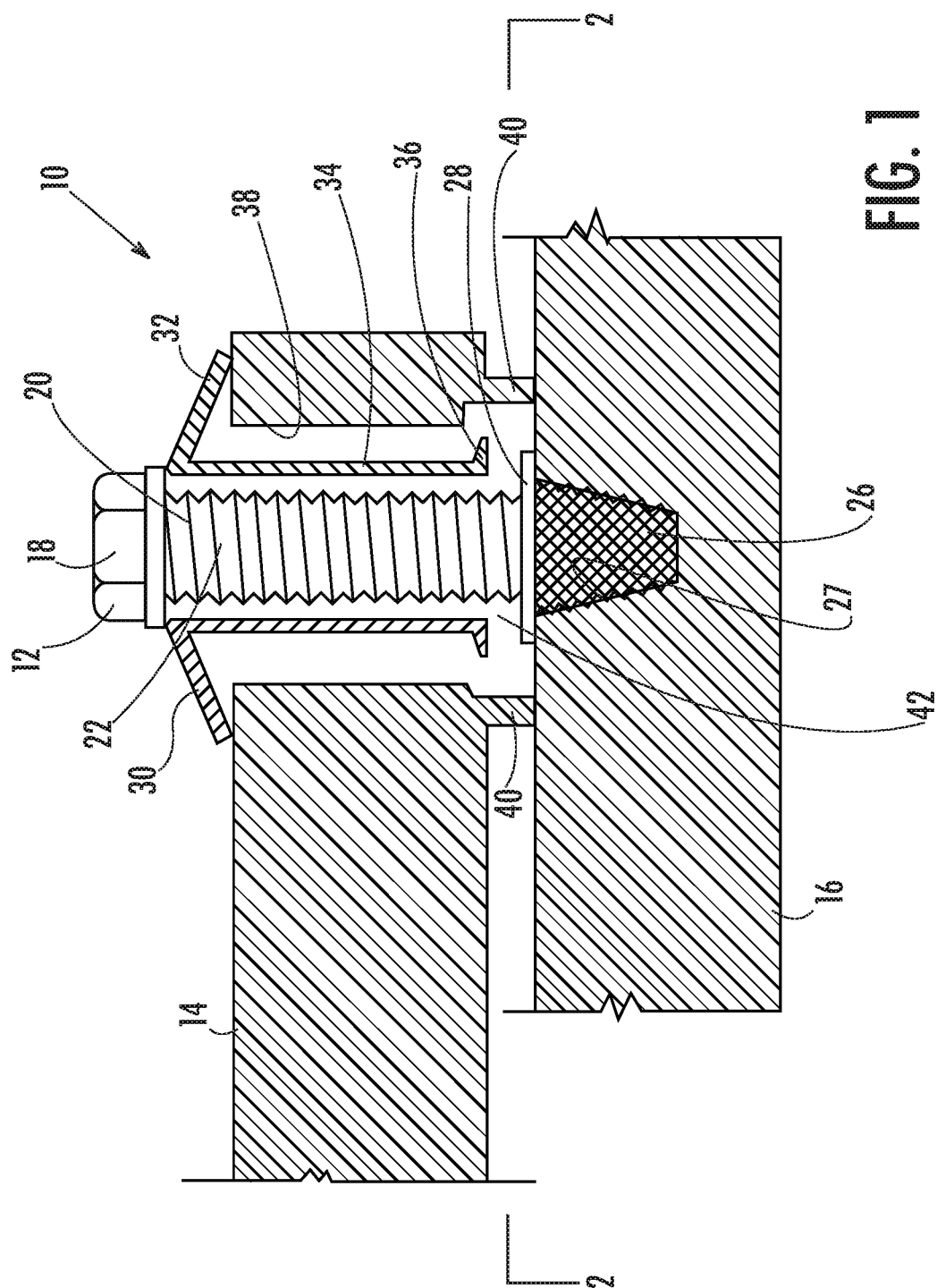
FIG. 1 is a sectional view of the compression limiting fastener assembly of the disclosed inventive concept upon initial attachment of the compression limiting fastener.

In the following figures, the same reference numerals will be used to refer to the same components. In the following description, various operating parameters and components are described for different constructed embodiments. These specific parameters and components are included as examples and are not meant to be limiting.

Referring to FIGS. 1 through 4, a compression limiting fastener assembly, generally illustrated as 10, is provided according to the disclosed inventive concept. The fastener assembly 10 includes a compression limiting bolt fastener 12 that is used to attach a plastic intake manifold flange 14 to a plastic cam cover 16. It is to be understood that while the disclosed inventive concept as illustrated and discussed is intended for use to attach a plastic intake manifold flange 14 to a plastic cam cover 16, the compression limiting bolt fastener 12 of the disclosed inventive concept may find use as well to attach virtually any plastic component to another plastic component.

The compression limiting bolt fastener 12 includes a bolt head 18 and a bolt shank 20. The bolt shank 20 has an upper portion 22 that may be threaded or unthreaded, depending on the particular application. The bolt shank 20 also includes a lower portion 24 that is threaded.

A conical, externally-knurled threaded insert 26 is provided in the component into which the compression limiting bolt fastener 12 is being threadably attached. In this instance, the conical threaded insert 26 is threadably fitted into a conical bore 27 formed in the plastic cam cover 16. A bearing collar 28 is fitted to the outer end of the conical treated insert 26.

The bearing collar 28 is wider than the upper end of the conical threaded insert 26, thereby limiting the depth into which the conical threaded insert 26 may be threadably inserted into the conical bore 27 upon assembly. It is to be understood that while the insert 26 is illustrated as being conical, other shapes of the insert 26 may be equally suitable for this purpose.

A spring stem compression limiter 30 is included to provide a consistent and assured amount of torque upon insertion of the compression limiting bolt fastener 12 into the conical threaded insert 26 upon fixing of the plastic intake manifold flange 14 to the plastic cam cover 16. The spring stem compression limiter 30 accomplishes this measure by combining a biasing element as well as a depth limiting element.

Particularly, the spring stem compression limiter 30 includes a spring stem flange 32 at the upper end of a tubular body 34 and a depth limiting flange 36 at the opposite or lower end of the tubular body 34. The spring stem compression limiter 30 may be made of any of a variety of materials, although a material such as spring steel may be most suitable for this application.

As illustrated, a bore 38 is formed in the plastic intake manifold flange 14. In addition, on the underside of the plastic intake manifold flange 14 is provided a molded and tuned compliance ring 40 that extends from the underside of the flange 14. As illustrated in FIG. 2 which is taken along line 2-2 of FIG. 1 and in which the underside of the plastic intake manifold flange 14 is illustrated, the molded and tuned compliance ring 40 is preferably concentric with the bore 38. It is to be noted that the thickness and width of the molded and tuned compliance ring 40 may be adjusted as required for the particular application, thus providing virtually unlimited tunability.

Figure 2:
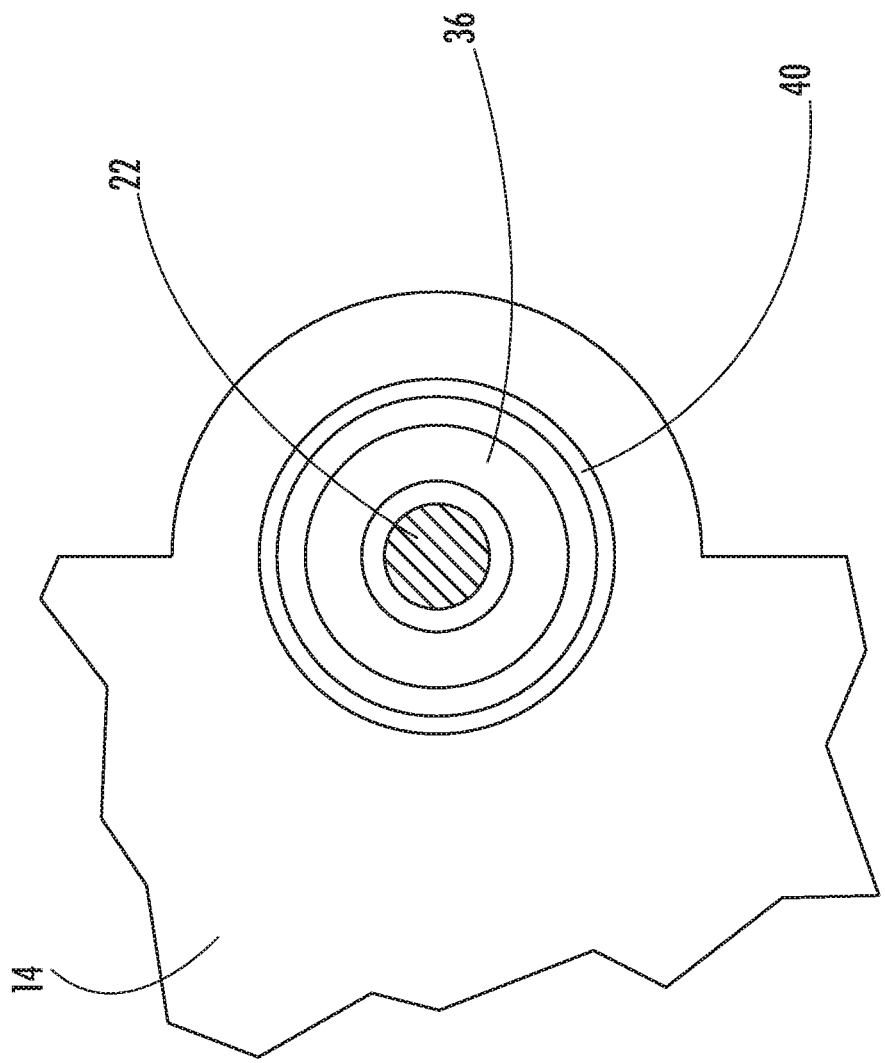
FIG. 2 is a sectional view taken along line 2-2 of FIG. 1 illustrating the concentric arrangement of the compliance ring relative to the fastening bolt.
Figure 3:
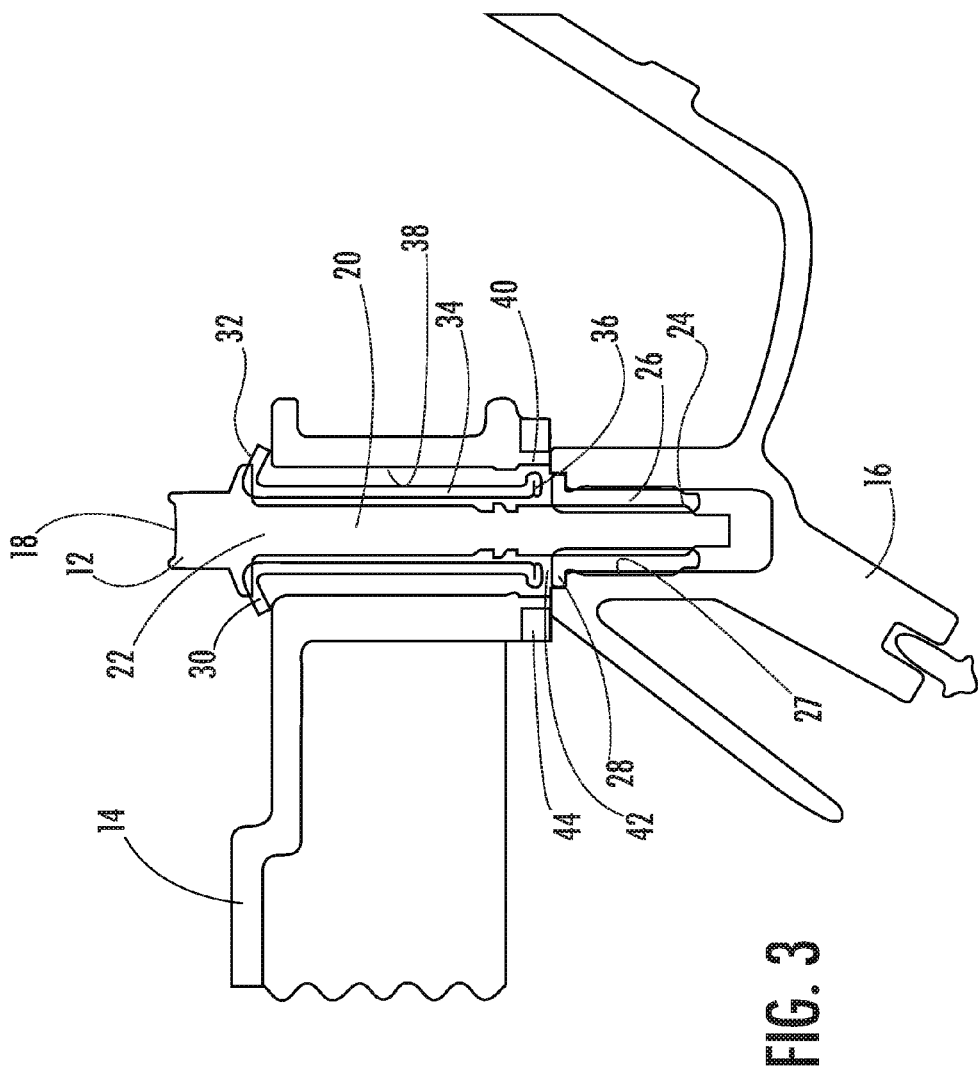
FIG. 3 is a sectional perspective view of intake manifold flange attached to a cam cover by the compression limiting fastener of the disclosed inventive concept.
Figure 4:
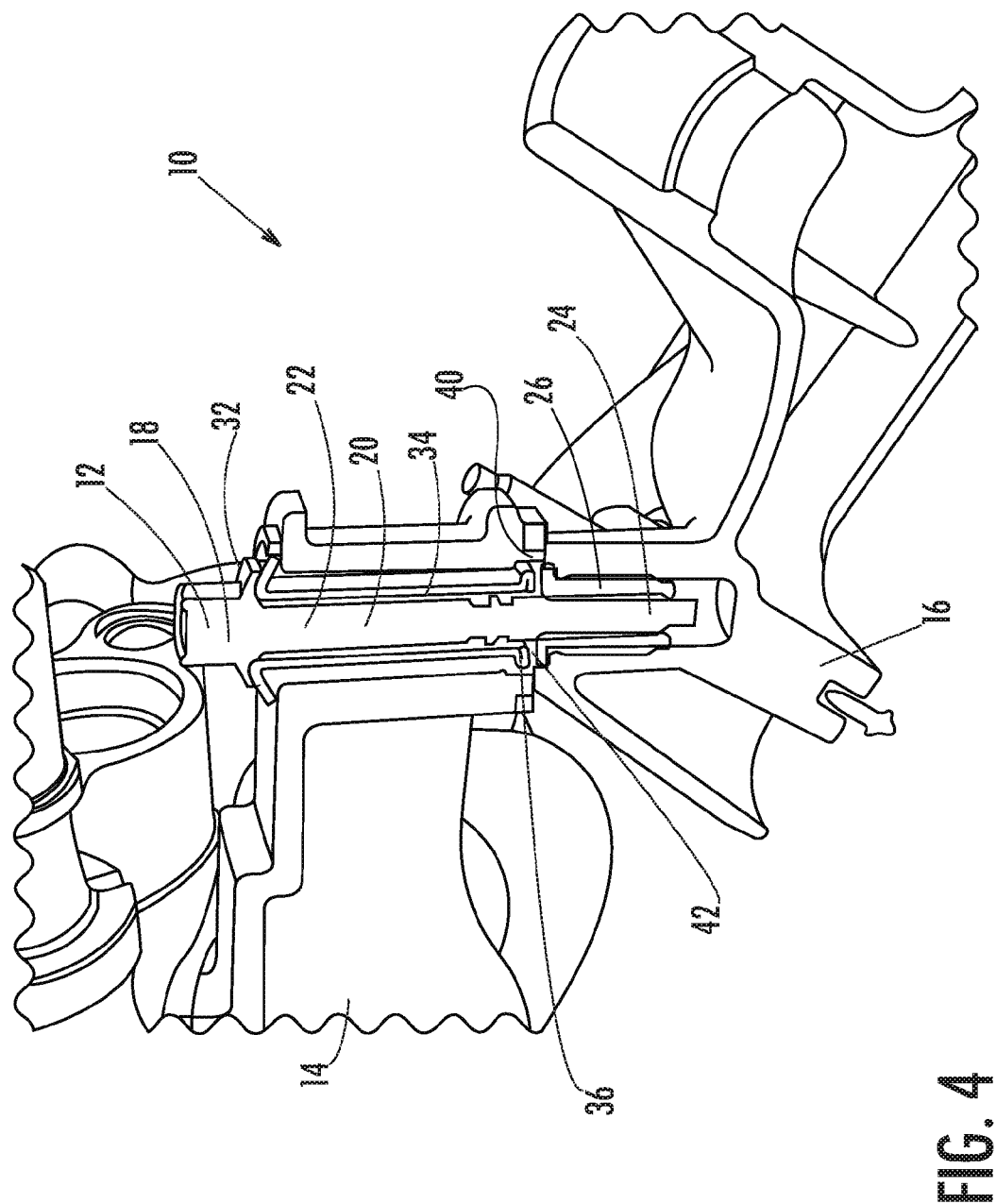
FIG. 4 is a further sectional view of an intake manifold flange attached to a cam cover by the compression limiting fastener of the disclosed inventive concept.

Upon initial assembly, and as illustrated in FIGS. 1, 2 and 4, the compression limiting bolt fastener 12 is loosely fitted into the bore 38. In this position, the spring stem flange 32 is in its untensioned state and the depth limiting flange 36 is spaced apart from the bearing collar 28 of the conical threaded insert 26. A pre-insertion gap 42 exists at this state of assembly between the depth limiting flange 36 and the bearing collar 28 of the conical threaded insert 26.

As the threaded lower portion 24 of the compression limiting bolt fastener 12 is threadably attached to the conical threaded insert 26, the spring stem flange 32 is put under an increasing load, causing the spring stem flange 32 to flare out against the upper side of the plastic intake manifold flange 14. The threaded lower portion 24 of the compression limiting bolt fastener 12 is threadably inserted into the conical thread insert 26 until the depth limiting flange 36 is at full contact with the bearing collar 28 of the conical threaded insert 26 as illustrated in FIG. 5. As illustrated in that figure, the bearing collar 28 functions as a bearing area for the depth limiting flange 36 of the spring stem compression limiter 30. At this point, the spring stem flange 32 is flared to its maximum extent and the plastic intake manifold flange 14 is fixedly attached to the cam cover 16 without damage to either the plastic intake manifold 14 or to the cam cover 16 and without the possibility of the compression limiting bolt fastener 12 becoming loose, even under circumstances of extreme engine vibration.

Thus, the disclosed invention as set forth above overcomes the challenges faced by known approaches to attaching one plastic component to another plastic component in an internal combustion engine. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A compression limiting fastener assembly for attaching an intake manifold to a cam cover, the assembly comprising:
   an intake manifold having a fastener-passing bore, an underside, and a compliant ring extending from said underside, said ring being concentric with said bore;
   a threaded cam cover;
   a bolt positioned through said manifold and into said cover; and
   a compression limiter having a tubular body, a spring stem flange and a depth limiting flange.

2. The compression limiting fastener assembly of claim 1, wherein said bolt extends through said tubular body, said tubular body having a top end and a bottom end, said spring flange being attached to said top end.

3. The compression limiting fastener assembly of claim 2, wherein said depth limiting flange is attached to said bottom end of said tubular body.

4. The compression limiting fastener arrangement of claim 3 wherein said threaded cam cover includes a threaded insert.

5. The compression limiting fastener arrangement of claim 4 wherein said threaded insert includes a bearing collar.

6. The compression limiting fastener arrangement of claim 5 wherein said threaded insert has a conical shape.

7. The compression limiting fastener arrangement of claim 1 wherein said intake manifold includes a flange and said fastener-passing bore is formed in said flange.

8. The compression limiting fastener arrangement of claim 1 wherein said manifold and said cam cover are composed of a polymerized material.

9. A compression limiting fastener arrangement for attaching an intake manifold to a cam cover, the assembly comprising:
   an intake manifold having a fastener-passing bore, an underside, and a compliant ring extending from said underside, said ring being concentric with said bore;
   a threaded cam cover having a bearing collar;
   a bolt positioned through said manifold and into said cover; and
   a compression limiter having a depth limiting flange positionable against said collar.

10. The compression limiting fastener arrangement of claim 9, wherein said compression limiter includes a tubular body through which said bolt extends, said tubular body having a top end and a bottom end, said depth limiting flange being attached to said bottom end.

11. The compression limiting fastener arrangement of claim 10, wherein said bolt includes a head and wherein said compression limiter further includes a spring stem flange attached to said top end of said tubular body and fitted between said head and said intake manifold.

12. The compression limiting fastener arrangement of claim 11 wherein said threaded cam cover includes a threaded insert.

13. The compression limiting fastener arrangement of claim 12 wherein said threaded insert has a conical shape.

14. The compression limiting fastener arrangement of claim 9 wherein said intake manifold includes a flange and said fastener-passing bore is formed in said flange.

15. The compression limiting fastener arrangement of claim 9 wherein said manifold and said cam cover are composed of a polymerized material.

16. A compression limiting fastener arrangement for attaching an intake manifold to a cam cover, the assembly comprising:
   an intake manifold having a fastener-passing bore, an underside, and a compliant ring extending from said underside around said bore;
   a threaded cam cover;
   a bolt positioned through said manifold and into said cover; and
   a compression limiter having first and second ends, said first end having a spring flange and said second end having a stop flange.

17. The compression limiting fastener arrangement of claim 16, wherein said bolt includes a bolt head and wherein said spring flange is fitted between said bolt head and said manifold.

18. The compression limiting fastener arrangement of claim 17, wherein said compression limiter includes a tubular body through which said bolt extends.

19. The compression limiting fastener arrangement of claim 18, wherein said compliant ring is concentric with said bore.

20. The compression limiting fastener arrangement of claim 19 wherein said manifold and said cam cover are composed of a polymerized material.

* * * * *